(12) United States Patent
Bof

(10) Patent No.: US 6,296,357 B1
(45) Date of Patent: Oct. 2, 2001

(54) CLAMPING DEVICE FOR SPECTACLE LENSES

(75) Inventor: Livio Bof, Segusino (IT)

(73) Assignee: Bline Optic, S.r.L., Via Cal Lusent (IT)

( * ) Notice: Subject to any disclaimer, the term of this patent is extended or adjusted under 35 U.S.C. 154(b) by 0 days.

(21) Appl. No.: 09/529,336

(22) PCT Filed: Oct. 13, 1997

(86) PCT No.: PCT/IB97/01259

§ 371 Date: Apr. 11, 2000

§ 102(e) Date: Apr. 11, 2000

(87) PCT Pub. No.: WO99/19760

PCT Pub. Date: Apr. 22, 1999

(51) Int. Cl.[7] .................................................. G02C 5/00
(52) U.S. Cl. ....................... 351/140; 351/152; 351/106
(58) Field of Search ............................ 351/86, 92, 106, 351/110, 140, 143, 148, 150, 152

(56) References Cited

U.S. PATENT DOCUMENTS

| 2,439,357 | 4/1948 | Bouchard | 351/103 |
| 2,680,847 | 6/1954 | Ball | 351/44 |
| 4,176,921 | 12/1979 | Matthias | 351/106 |
| 4,504,127 | * 3/1985 | Cottet | 351/86 |

FOREIGN PATENT DOCUMENTS

| 3612989 | * 10/1987 | (DE) | 351/106 |
| 0 790 519 A1 | 6/1996 | (EP) . | |

* cited by examiner

*Primary Examiner*—Huy Mai
(74) *Attorney, Agent, or Firm*—Oppenheimer, Wolff & Donnelly LLP

(57) ABSTRACT

A device (10) for clamping a lens (11) to a spectacle frame (12) comprises a bridge (16), which is rotatable about a pin (19) fixed to the body of the frontal frame or to the nose pad carrying element of the spectacle, said bridge being provided with two opposite ends relative to said pin, of which: a first end (27) is provided with a thread suitable for cooperating with a screw (26) which is suitable for causing the rotation movement of the bridge about said pin; and the second end (28) directly cooperates with the lens, by exerting a force on the surface of said lens, said force keeping the lens pressed against a conjugate element (22, 24) which is present on the body of the frontal frame and/or of the nose pad carrying element.

20 Claims, 2 Drawing Sheets

CLAMPING DEVICE FOR SPECTACLE LENSES

TECHNICAL FIELD

The present invention relates to a clamping device for spectacle lenses.

More particularly, the present invention relates to a device suitable for fastening and clamp a spectacle lens respectively to the spectacle frontal frame and/or to the nose pad carrying element, said device allowing the lens to be kept clamped against said elements with no need to drill and/or to mill the lens, and with no need to settle any frame or peripheral rim to the lens.

The invention can be applied specifically in the field of spectacles manufacturing.

BACKGROUND ART

In the spectacle manufacturing industry, there is always the need to optimize technical methods in order to lower the spectacles weight and dimensions as much as possible and, moreover, to succeed in realizing new aesthetical shapes and to give the opticians the greatest flexibility in fitting lenses to spectacles.

In this context, a method if known in the art according to which the lens is directly clamped to the frontal frame and/or nose pad carrying element, in order to achieve a correct clamping of the lens and its steadiness relative to the frontal frame and/or nose pad carrying element, the lens is drilled and/or milled at its peripherical edge, and the frontal frame and/or nose pad carrying element are directly connected and fastened to the lens by means of a through screw.

Other solutions known in the art relate to the use of joining systems.

Said solutions involve some important drawbacks and disadvantages since that drilling lenses, operation which is carried out by means of very particular drills to be used with great accuracy, often causes breakages and cracks in the lenses, and this considerably increases spectacles production and assembling costs.

DESCRIPTION OF THE INVENTION

The present invention aims to obviate to the drawbacks and disadvantages of the prior art by providing a device for clamping a spectacle lens to a frontal frame and/or nose pad carrying element which does not require the lens to be bored or drilled.

This is achieved by means of the features described in the main claim.

The dependent claims outline particularly advantageous forms of embodiment of the device according to the invention.

According to the invention, the clamping device comprises a bridge, which is rotatable about a pin fixed to the body of the frontal frame or to the nose pad carrying element of the spectacle, said bridge being provided with two opposite ends relative to said pin, of which:

- a first end is provided with a thread suitable for cooperating with a screw which is suitable for causing the rotation movement of the bridge about said pin; and
- the second end directly cooperates with the lens, by exerting a force on the surface of said lens, said force keeping the lens pressed against a conjugate element which is present on the body of the frontal frame and/or of the nose pad carrying element.

First of all, such a form of embodiment allows to avoid the use of through screws in the lens body for its fastening, thereby achieving the purposes of the present invention.

Secondly, the optician has a higher flexibility in assembling the lens to the frontal frame and/or nose pad carrying element, since there is no predetermined clamping point (as it is the case of a drill in the lens) and the lens can be clamped in many different positions conferring different shapes to the spectacle according to any optical or aesthetic needs.

ILLUSTRATION OF DRAWINGS

Other features and advantages of the invention will become apparent while reading the following description, which has been given as a non-limiting example, with the help of the figures illustrated in the attached drawings, in which.

DESCRIPTION OF A PREFERRED FORM OF EMBODIMENT

Figure 1:
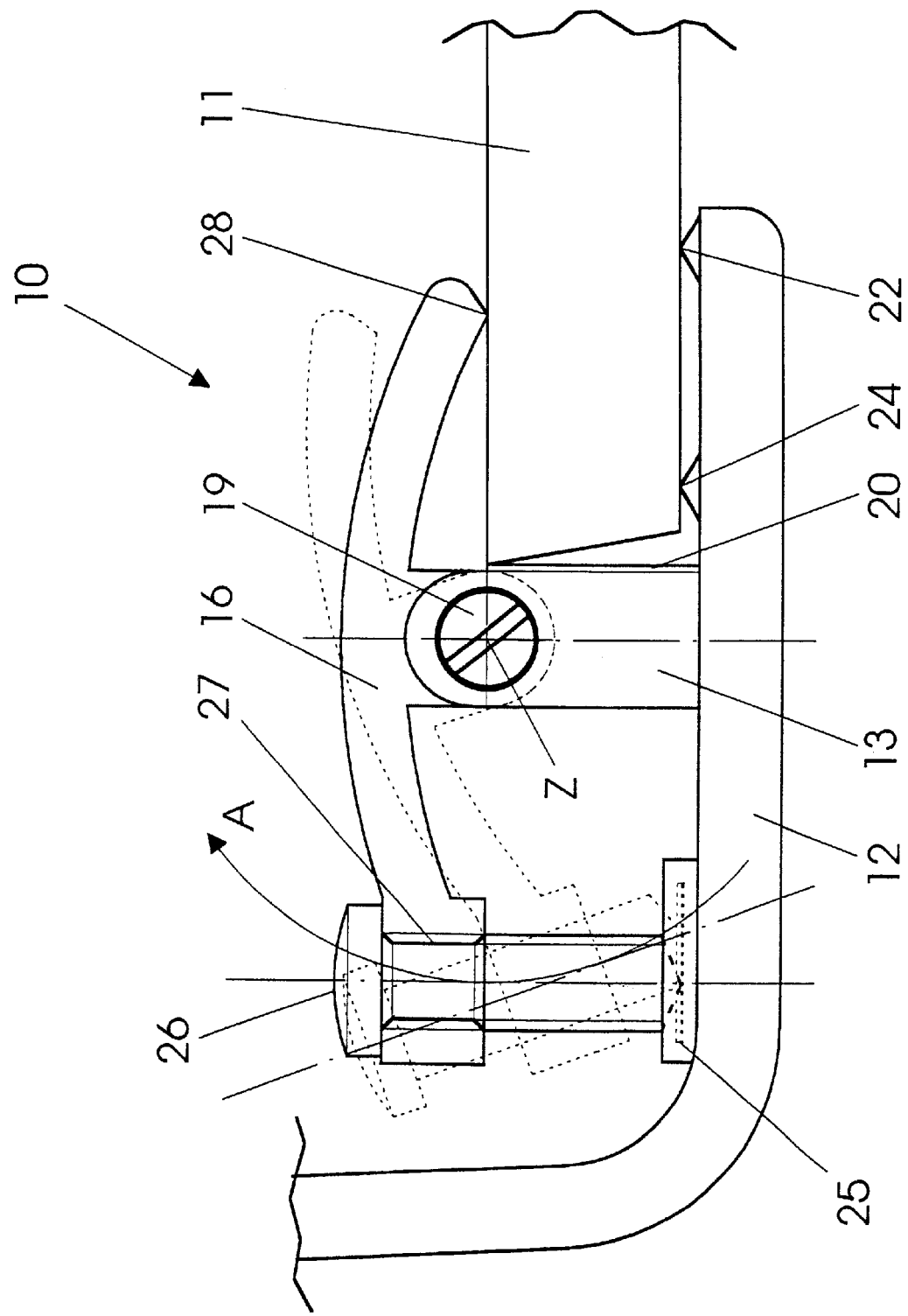
FIG. 1 shows a schematical plan view of a spectacle frontal frame provided with a device according to the invention.
Figures 2, 3:
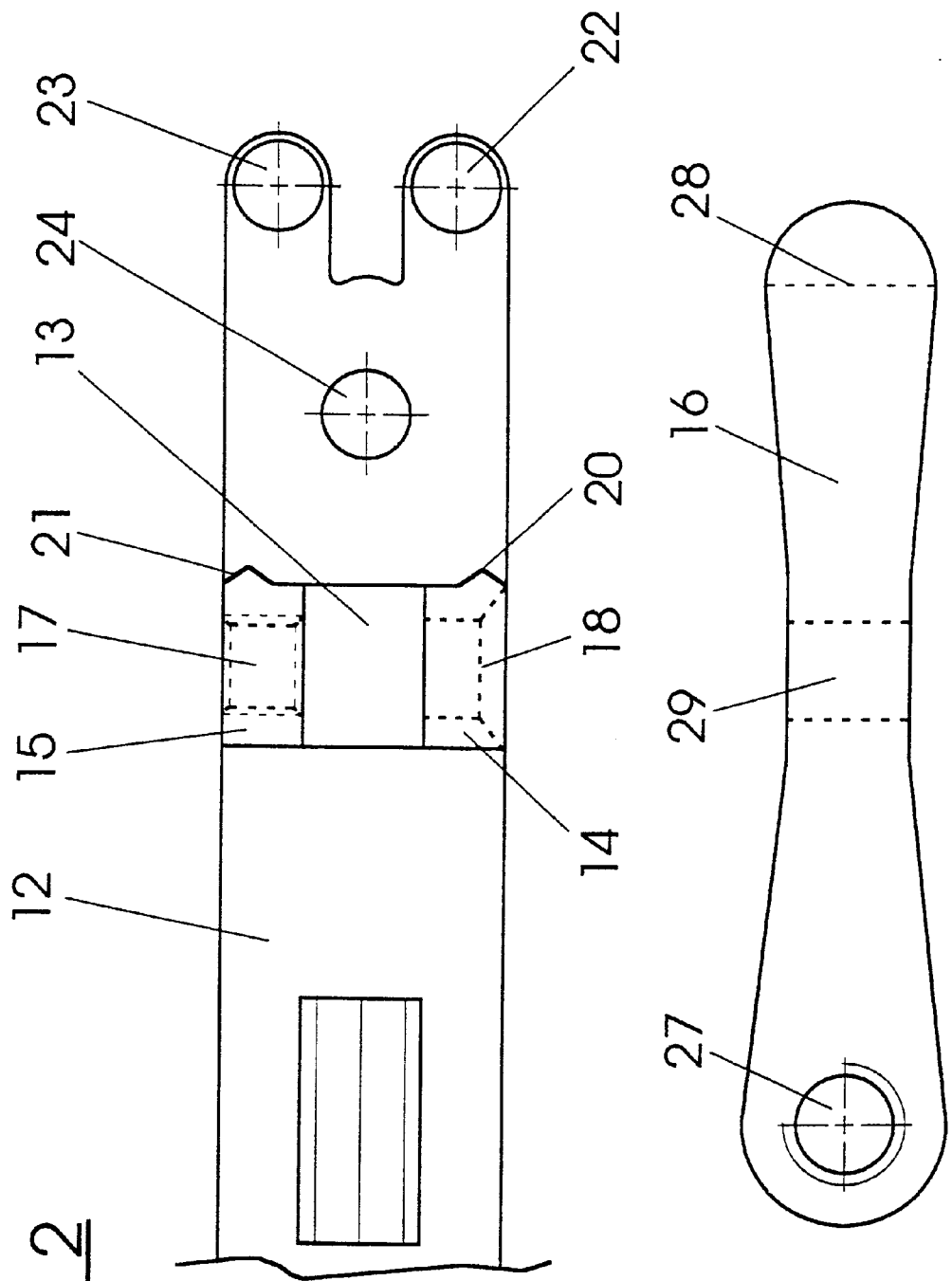
FIG. 2 shows a plan view of the frontal frame of FIG. 1, without the bridge.
FIG. 3 shows a plan view of the bridge.

In the figures, reference sign 10 generally indicates a clamping device for spectacle lenses 11.

Device 10, which is represented as placed on frontal frame 12 of a spectacle in the figures, comprises a base element 13 constituted by a pair of uprights 14, 15 between which is arranged a guiding groove for bridge 16 which will be later described in more details.

Said base element 13 can be integral to frontal frame body 12, or it can be constituted by a distinct element which is made integral to the frontal frame body by means of welding, screwing, etc.

Each upright 14, 15 is provided with a cross through hole, two respective holes 17, 18 being aligned to each other.

More particularly, hole 17 provided in upright 15 is threaded, while hole 18 provided in upright 14 has a seat which is suitable for receiving screw 19 which is engaged, in use, in the thread of hole 17.

Besides, base element 13 comprises a pair of protuberances 20, 21, each of them starting from one of the uprights, and which are used for the correct location of lens 11 during the spectacle assembling, in such a way which will be later described in more details.

According to this particular form of embodiment, frontal frame 12 is provided with a set of protuberances 22, 23, 24, sidewise arranged relative to base element 13, and which support lens 11.

Finally, in this case frontal frame 12 is provided with elongated element 25, placed at the opposite side of protuberances 22–24 relative to base element 13, and integral to frontal frame 12, said element 25 acting as rectilinear guide for the translation movement of the end of screw 26 which cooperates with the thread arranged into hole 27 provided at one of the ends of bridge 16.

According to another form of embodiment, not shown in the figures, element 25 can be constituted by a suitable groove obtained in frontal frame body 12.

According to this form of embodiment, bridge 16 is constituted by a curved bar at one end of which is present said hole 27, while at the other end the external surface is shaped in order to obtain an edge 28 which is suitable for acting, according to a predetermined angle of incidence, against lens surface 11.

According to another form of embodiment, edge 28 can be replaced by other different structures suitable to achieve the prefixed purposes, such as, for instance, knurlings, cuttings, applied suckers, etc.

In its central portion, bridge 16 shows an extension provided with through hole 29 into which, in use, is introduced screw 19, the screwing of which allows bridge 16 to be clamped in a predetermined position, thus cooperating to the clamping of lens 11.

Said through hole 29 can either have a circular section, and then it can be adapted to fit to screw diameter 19, or it can be constituted by a slot, in which screw 19 is introduced, and which allows the movement of bridge 16 so that it can be raised or lowered between two limit positions.

Hereinbelow, the assembling operation of lens 11 to spectacle frontal frame 12 will be described with particular reference to FIG. 1.

At the beginning bridge 16 cooperates with frontal frame 12 by introducing the central portion of the bridge into the groove arranged between uprights 14, 15 of base element 13.

Screw 19 is introduced into respective aligned holes 18, 29 and 17, and then screwed on the thread of hole 17.

In such a position bridge 16 can swing about longitudinal axis Z of screw 19.

Then, screw 26 is introduced in threaded hole 27 and run in such a way that its lower end can cooperate with rectilinear guide 25, as shown in dashed lines in FIG. 1.

Thus the screwing of screw 26 causes the progressive rotation of bridge 16 about axis Z according to a direction indicated by arrow A, thereby producing the sliding of the end of screw 26 along rectilinear guide 25, the raising of the end provided with hole 27 of bridge 16 and the lowering against lens surface 11 of the end of bridge 16 provided with edge 28.

When edge 28 has contacted lens surface 11, the lens is pressed on one hand against protuberances 22, 23, 24 arranged on frontal frame body 12, and, on the other hand against protuberances 20 and 21 arranged on the body of base element 13, thanks to the particular angle of incidence of edge 28.

In fact, thanks to said angle of incidence the force exerted by the end of bridge 16 against the lens is divided into a main component directed towards the protuberances 22, 23, 24 and into a secondary component directed towards protuberances 20, 21.

In this way, the screwing of screw 26 causes the clamping of lens 11 to frontal frame 12 thereby achieving the purposes of the invention.

The invention has previously been described with reference to a particularly advantageous form of embodiment thereof.

However, it appears to be clear that the invention is not limited to this form of embodiment, and that it comprises several equivalent forms of embodiment.

For instance, according to another form of embodiment of the present invention bridge 16 has a central hole provided inside of the body thereof and not inside of an extension as shown in FIG. 1.

According to another form of embodiment, bridge 16 has a generally rectilinear shape, and it does not have a curved shape as illustrated in FIG. 1.

According to another form of embodiment the frontal frame is provided with a threaded hole, and the end of a screw which is inserted into said hole pushes against a bridge end.

Moreover, in the form of embodiment shown in FIG. 1, the bridge head may be articulated, a counterpiece being provided in order to limit the rotation movement.

Finally, according to another form of embodiment, the same solution used to clamp the lens can be usede to clamp the lens to the nose pad carrying element.

All these forms of embodiment, and many others too, have to be considered all mechanical equivalents.

What is claimed is:

1. A device for clamping a lens to at least one of a frontal frame or to a nose pad carrying element of a spectacle, comprising a bridge rotatable about a fixed pin related to at least one of said frontal frame or nose pad carrying element, one end of said bridge having first means suitable for cooperating with the surface of said lens to clamp between said one end and the body of at least one of said frontal frame or nose pad carrying element, and the other end of said bridge having second means suitable for controlling the rotation movement of the bridge about said fixed pin to achieve the clamping and the release of said lens.

2. A device according to claim 1, wherein said first means are constituted by an edge of said one end, said edge having a predetermined angle of incidence relative to the surface of said lens.

3. A device according to claim 1, wherein said first means are constituted by said one end either being knurled or cut, or carrying at least a sucker applied thereto.

4. A device according to any of the preceding claims, wherein the body of said frontal frame and/or nose pad carrying element is provided with at least a means suitable for constituting a support for said lens.

5. A device according to claim 1, wherein said fixed pin is placed on a base element integral to or made integral to the body of at least one of the said frontal frame or the nose pad carrying element.

6. A device according to claim 5, wherein said base element comprises a pair of uprights provided with aligned holes into which said fixed pin is introduced, said bridge being provided with a hole aligned to said holes, and being in a groove of said base element between said pair of uprights.

7. A device according to claim 6, wherein said hole either has a circular section, or is constituted by a slot inside of which said fixed pin is placed.

8. A device according to claim 1, wherein said second means are respectively constituted by a threaded hole obtained at the said other end of the bridge, as well by a screw introduced in said threaded hole, and the end of said screw, having third guiding means which enables a rectilinear translation of said end so that at least one of the screwing or unscrewing of said screw in said threaded hole causes on one hand a rotation movement of said bridge about the fixed pin, and on the other hand a rectilinear translation movement of the end of said screw along said rectilinear guide.

9. A device according to claim 2, wherein said fixed pin is placed on a base element integral to or made integral to the body of at least one of the said frontal frame or the nose pad carrying element.

10. A device according to claim 9, wherein said base element comprises a pair of uprights provided with aligned holes into which said fixed pin is introduced, said bridge, being provided with a hole aligned to said holes, and being in a groove of said base element between said pair of uprights.

11. A device according to claim 10, wherein said hole either has a circular section, or is constituted by a slot inside of which said fixed pin is placed.

12. A device according to claim 11, wherein said second means are respectively constituted by a threaded hole obtained at the said other end of the bridge, as well by a screw introduced in said threaded hole, and the end of said screw having with third guiding means which enables a rectilinear translation of said end so that at least one of the screwing or unscrewing of said screw in said threaded hole causes on one hand a rotation movement of said bridge about the fixed pin, and on the other hand a rectilinear translation movement of the end of said screw along said rectilinear guide.

13. A device according to claim 3, where said fixed pin is placed on a base element integral to or made integral to the body of at least one of the said frontal frame or the nose pad carrying element.

14. A device according to claim 13, wherein said base element comprises a pair of uprights provided with aligned holes into which said fixed pin is introduced, said bridge, being provided with a hole aligned to said holes, and being in a groove of said base element between said pair of uprights.

15. A device according to claim 14, wherein said hole either has a circular section, or is constituted by a slot inside of which said fixed pin is placed.

16. A device according to claim 15, wherein said second means are respectively constituted by a threaded hole obtained at the said other end of the bridge, as well by a screw introduced in said threaded hole, and the end of said screw having with third guiding means which enables a rectilinear translation of said end so that at least one of the screwing or unscrewing of said screw in said threaded hole causes on one hand a rotation movement of said bridge about the fixed pin, and on the other hand a rectilinear translation movement of the end of said screw along said rectilinear guide.

17. A device according to claim 4, wherein fixed pin is placed on a base element integral to or made integral to the body of at least one of the said frontal frame or the nose pad carrying element.

18. A device according to claim 17, wherein said base element comprises a pair of uprights provided with aligned holes into which said fixed pin is introduced, said bridge, being provided with a hole aligned to said holes, and being in a groove of said base element between said pair of uprights.

19. A device according to claim 18, wherein said hole either has a circular section, or is constituted by a slot inside of which said fixed pin is placed.

20. A device according to claim 19, wherein said second means are respectively constituted by a threaded hole obtained at the said other end of the bridge, as well by a screw introduced in said threaded hole, and the end of said screw having with third guiding means which enables a rectilinear translation of said end so that at least one of the screwing or unscrewing of said screw in said threaded hole causes on one hand a rotation movement of said bridge about the fixed pin, and on the other hand a rectilinear translation movement of the end of said screw along said rectilinear guide.

* * * * *